United States Patent [19]

Ferguson et al.

[11] 4,280,830

[45] Jul. 28, 1981

[54] UREA-FORMALDEHYDE GRANULAR FERTILIZER

[75] Inventors: Fred E. Ferguson, Marysville; Rory R. Hughes, Westerville; Kenneth E. Fersch, Marysville, all of Ohio

[73] Assignee: O. M. Scott and Sons Company, Marysville, Ohio

[21] Appl. No.: 114,638

[22] Filed: Jan. 23, 1980

[51] Int. Cl.³ .............................................. C05F 11/00
[52] U.S. Cl. ........................................ 71/25; 71/28; 71/29; 71/61; 71/64 G; 71/DIG. 1
[58] Field of Search ................... 71/29, 25, 64 G, 30, 71/64 DB, 28, 23, DIG. 1

[56] References Cited

U.S. PATENT DOCUMENTS

| 93,607 | 8/1869 | Fish | 71/23 |
|---|---|---|---|
| 2,347,730 | 4/1951 | Arnold et al. | 71/23 |
| 2,867,521 | 1/1959 | Jeffreys | 71/25 |
| 3,076,700 | 2/1963 | Renner | 71/29 |
| 3,252,785 | 5/1966 | Hoblit | 71/29 |
| 3,497,345 | 2/1970 | Duyfies | 71/DIG. 1 |
| 3,640,696 | 2/1972 | Goldmann | 71/25 |

FOREIGN PATENT DOCUMENTS

| 2739618 | 3/1979 | Fed. Rep. of Germany | 71/23 |
|---|---|---|---|
| 661066 | 3/1964 | Italy . | |
| 1009893 | 11/1965 | United Kingdom | 71/DIG. 1 |

*Primary Examiner*—S. Leon Bashore
*Assistant Examiner*—Michael Goldman
*Attorney, Agent, or Firm*—James B. Raden; Harold J. Holt

[57] ABSTRACT

A free-flowing granular fertilizer composition and a process for its preparation in which the granules comprise expanded, substantially oil-free coffee grounds as a carrier coated and impregnated with a urea-formaldehyde condensation product. The condensation product has from 1 to 3 moles of urea for each mole of formaldehyde and the composition has at least 15% of the total nitrogen in cold water insoluble form.

14 Claims, No Drawings

UREA-FORMALDEHYDE GRANULAR FERTILIZER

This invention relates to a granular urea-formaldehyde fertilizer composition and to a process for its preparation.

Urea-formaldehyde fertilizers in granular form are widely used on turf grasses for their desirable agronomic characteristics and ease of application. U.S. Pat. No. 3,076,700 to V. A. Renner, assigned to the present assignee, is directed to one such fertilizer which has been in widespread use for many years. The fertilizer disclosed in that patent utilizes expanded vermiculite as a carrier for the urea-formaldehyde as well as the phosphorus and potassium nutrient sources. Another material that has been considered as a carrier is perlite, which like vermiculite, must be expanded prior to use as a carrier. The pre-expansion of these inorganic carriers requires both time and energy resources and it would thus be desirable to find a suitable carrier which avoids this preprocessing step.

In the production of soluble coffee, the solid grounds remaining after extraction of water soluble constituents presents a waste disposal problem. A number of uses have been suggested for the coffee grounds, including use as a soil conditioner or humus like material for addition to the soil. British Pat. No. 1,292,049, published Oct. 12, 1972, suggests the use of decomposed or fermented coffee grounds, together with other decomposed organic material, for improving soils. Italian Pat. No. 661,066, granted Mar. 7, 1964 discloses the use of coffee grounds as a carrier for herbicides and insecticides. However, insofar as is known, coffee grounds have never been suggested for use as a granular carrier for fertilizers nor has a successful means of producing a granular fertilizer carrier from coffee grounds ever been disclosed.

A principal object of the present invention is to provide a highly effective slow release fertilizer based on the use of a readily available, hitherto waste material, as a carrier.

A more specific object of the present invention is the provision of a granular fertilizer based on coffee grounds as a carrier, which fertilizer has free-flowing properties and contains large proportions of nitrogen nutrient in a form which is slowly released to the soil.

It is an additional object of the present invention to provide an economical process for preparing a granular fertilizer composition.

The foregoing and other objects of the invention are achieved in a fertilizer composition comprising free-flowing granules, the granules comprising expanded, substantially oil-free coffee grounds as a carrier, said coffee grounds being the residue of coffee beans remaining after extraction of the soluble components. The coffee grounds are coated and impregnated with a urea-formaldehyde condensation product in which the ratio of urea to formaldehyde ranges from 1 to 3 moles of urea for each mole of formaldehye. The fertilizer composition has at least 15% of the total nitrogen in cold water insoluble form.

The process of producing the foregoing fertilizer composition comprises producing an aqueous solution of methylol urea from an alkaline solution containing urea and formaldehyde in which the ratio of urea to formaldehyde ranges from 1 to 3 moles of urea for each mole of formaldehyde. Substantially oil-free coffee grounds are contacted with said aqueous solution of methylol urea to expand said coffee grounds and to coat and impregnate the expanded coffee grounds with the methylol urea. The methylol urea, while coated and impregnated on the coffee grounds, is then acidified to form a urea-formaldehyde condensation product.

The term "coffee grounds" as used herein is intended to identify the spent residue of the coffee bean remaining after extraction of the soluble components used for producing water-soluble coffee powders. In the production of so called "instant" or "freeze-dried" coffees, the coffee bean, from which the husk or hull has been removed, is roasted, ground to suitable size and the soluble portions are extracted. The extracted portions are then spray-dried or freeze-dried to produce soluble coffees. The residue of the bean after extraction constitutes a considerable quantity of solid waste, normally over half the original weight of the bean, and has hitherto presented a considerable waste disposal problem. Coffee grounds, produced in the commercial production of soluble coffee, are normally in the form of flakes containing about 65% moisture. On a dry basis, the flakes contain about 18-20% by weight of natural oils. We have found that these oils should be substantially removed from the coffee grounds in order to achieve an acceptable level of urea-formaldehyde absorption. When the oils are not removed, the coffee grounds have much lower absorptive capacity, thus taking up less urea-formaldehyde resulting in lower nitrogen analysis and greater inerts. No more than 4% and preferably no more than 2%, of natural oils should remain. The moisture content of the coffee flakes should also preferably be reduced to from 3 to 7% by weight prior to removal of the oils.

Chemical analysis of a typical sample of coffee grounds, after solvent extraction, useful in the invention is as follows:

| | |
|---|---|
| Total Nitrogen | 2.82% |
| $P_2O_5$ | 0.003% |
| $K_2O$ | 0.13% |
| Moisture | 2.0–8.75% |
| pH | 3.9–5.1 |

Spent coffee grounds, as received and prior to oil extraction, are reported in the literature to contain about 65% carbohydrates, 15% proteins and 18% oil. The carbohydrates are made up of monosaccharides, aligosaccharides and polysaccharides. The proteins are anhydrocopolymers of amino acids of which seventeen amino acids have been reported. The oils are glycerides.

A significant aspect of the present invention involves the discovery that a granulation effect is obtained on the coffee grounds when they are contacted with an aqueous solution of the urea-formaldehyde condensation product. The water expands, enlarges and agglomerates the coffee grounds to, in effect, convert a flaked material to a granular material, which, upon drying, is free flowing. Moreover, the change in particle size is retained and stabilized by the urea-formaldehyde condensation product which coats and impregnates the expanded granule. This phenomena appears to be unique with a urea-formaldehyde/water solution. We did not obtain this expansion and/or agglomeration effect with any other solution investigated. This unique characteristic of the coffee grounds/urea-formaldehyde system also eliminates the necessity of preprocessing the coffee grounds because expansion of the coffee grounds occurs during impregnation and coating with the urea-formaldehyde condensation product. In the case for example of a vermiculite carrier, the vermiculite ore must first be heated in a furnace to temperatures of the order of 1800° to 2000° F. to expand the ore and increase its porosity.

In the preparation of the present fertilizer compositions, urea and formaldehyde are first reacted in aqueous solution under alkaline conditions to produce a solution containing a preponderance of urea and formaldehyde in the form of methylol urea. This portion of the process is substantially the same as that set forth in the aforesaid U.S. Pat. No. 3,076,700. The urea to formaldehyde molar ratio should preferably be maintained within the range of from 1.6 to 2.5 moles of urea per mole of formaldehyde. The pH of the solution should be maintained between about 7 to 9.5 with, for example, NaOH. The temperature of the methylol urea reaction should desirably be maintained between about 50° and 80° C., preferably between about 65° and 72° C. The amount of water should be from about 8 to 25% by weight of the solution. About 8% water is necessary for urea dissolution. Amounts greater than 25% may be used but are unnecessary and, since the water must subsequently be removed, it is obviously desirable not to use more water than is needed. Typically about 13 or 14% water is used for preparation of the methylol urea. It is frequently desirable to start with a commercially available urea-formaldehyde aqueous concentrate to which urea and water are added.

The coffee grounds, obtained as the spent residue from the manufacture of instant coffee, are first extracted by a solvent extraction process to remove the bulk of the oil. Solvent extraction of the oil may be carried out in known fashion. A suitable solvent extraction process is set forth in *Chemical Process Industries*, by Shreve, McGraw Hill, 1967, Chapter 28, pages 527-532. Normally, the granular fertilizer will contain phosphorus and postassium nutrients, as well as nitrogen. For this purpose the substantially oil-free coffee grounds are thoroughly blended with a source of phosphorus and potassium, typically a salt such as monoammonium phosphate, potassium sulfate and potassium chloride. In addition, other salts such as ammonium sulfate and ferrous sulfate may be added. The coffee grounds should be used in an amount such that they will comprise about 10 to 50% by weight, usually 20-35%, of the total weight of the fertilizer composition.

Immediately upon completion of heating the methylol urea solution, it is sprayed evenly on the blended coffee grounds and the P,K and other nutrients while they are being mixed. This will cause swelling and agglomeration of the fertilizer base ingredients. Mixing is continued until a homogenous blend is achieved. At this point, the now granular impregnated and coated coffee grounds are acidified by, for example, spraying evenly with sulfuric or phosphoric acid to obtain a pH of from about 2.0 to 6.5 to condense the methylol ureas to methylene ureas and to effect a "drying" action on the granules which sustains the particle integrity in their granular form. In commercial production, this pH range will normally be above 4.5. The granulated material is then cured as necessary to effect final condensation and dried at about 100° to 200° C. to a moisture content of less than 2½%. The dried product is then reduced to the desired particle size range by standard classifying techniques. The final product has at least 15%, preferably at least 25%, of the total nitrogen in cold water insoluble form. The nutrient proportions may vary widely, ranging from 15 to 35% by weight of the fertilizer as total nitrogen and from 0 to 20% by weight of phosphorus or potassium (measured as $P_2O_5$ and $K_2O$ respectively). Normally the total nitrogen should be above 20% if the weight of phosphorus or potassium is below 10%.

The following examples illustrate the practice of the invention. All parts and percentages are by weight unless otherwise indicated.

EXAMPLE 1

A 27-3-3 ($N—P_2O_5—K_2O$) fertilizer was prepared from the following ingredients in the following amounts:

| Ingredient | Gms |
|---|---|
| Urea | 792.04 |
| U-F Concentrate | 307.05 |
| Water | 99.44 |
| Potassium Chloride | 105.84 |
| Monoammonium Phosphate | 113.98 |
| Coffee Grounds | 453.59 |
| $H_2SO_4$ (24.2%) | 143.93 |

(The U-F Concentrate in this and the following examples, was a commercially available resinous concentrate sold under the trade identification UFC-85 containing 25% urea, 60% formaldehyde, remainder water). The urea, U-F concentrate and water was added in suitable mixing equipment. The pH was adjusted and maintained between 8.0 and 9.0 with NaOH solution while the mixture was heated at 65°-72° C. for 30-45 minutes.

The coffee grounds used in this example were grounds, from which the natural oils had been extracted to a level of less than 2%. The coffee grounds were flake-like in shape and had the following physical characteristics:

| Bulk Density | 24.5 |
|---|---|
| (lbs/cu. ft.) | |
| Screen Analysis | % |
| +8 | 0.2 |
| −8+10 | 0.1 |
| −10+20 | 14.8 |
| −20+40 | 62.9 |
| −40+70 | 1.8 |
| −70+100 | 7.5 |
| −100 | 12.7 |
| Absorptive Capacity | |
| (lbs solvent/100 lbs. solid) | |
| Water | 166 |
| Hexylene Glycol | 50.6 |
| Polybutene polymer* | 53.4 |

*Used as a sticking agent for fertilizers and pesticides.

While the methylol urea mixture, having a U-F mole ratio of 2.35/1.0, was being heated, the coffee grounds, monoammonium phosphate and potassium chloride were mixed until thoroughly blended. Upon completion of heating of the U-F mixture, it was immediately sprayed evenly on the mixing dry ingredients causing swelling of and agglomeration of the coffee grounds. Mixing was continued until a homogenous blend was achieved, at which time the sulfuric acid was sprayed evenly on the fertilizer bed to achieve a pH of 2.45. The fertilizer product was then dried in an oven at 50° C. for twenty hours. The product was a free-flowing granular fertilizer having the following final chemical analysis:

| | |
|---|---|
| Total Nitrogen | 27.34% |
| CWIN[1] | 38.92% |
| HWIN[2] | 11.52% |
| P$_2$O$_5$ | 2.89% |
| K$_2$O | 3.31% |
| Moisture | 4.03% |
| pH | 2.45 |

[1] Cold water insoluble nitrogen as percent of total nitrogen.
[2] Hot water insoluble nitrogen as percent of total nitrogen.

The cold and hot water insoluble nitrogen percentages were determined by Method Numbers 2.062 and 2.069 respectively of the Official Methods of Analysis of the Association of Official Analytical Chemists, 12th Edition 1975.

The bulk density of the final product was 33.4 lbs/cu. ft. and it had the following screen analysis (U.S. Standard mesh):

| | % |
|---|---|
| +8 | 1.1 |
| −8+10 | 9.4 |
| −10+20 | 61.1 |
| −20+40 | 22.1 |
| −40+70 | 5.4 |
| −70+100 | 0.5 |
| −100 | 0.4 |

EXAMPLE 2

A 25-3-4 fertilizer composition was prepared as in Example 1 from the following ingredients:

| Ingredient | GMS |
|---|---|
| Urea | 742.25 |
| U-F Concentrate | 343.63 |
| Water | 109.97 |
| Potassium chloride | 109.50 |
| Monoammonium Phosphate | 118.67 |
| Coffee Grounds | 453.59 |
| H$_2$SO$_4$ | 32.55 |

Final analysis of the fertilizer product was as follows:

| | |
|---|---|
| Total Nitrogen | 24.65% |
| CWIN | 46.25% |
| HWIN | 10.18% |
| P$_2$O$_5$ | 3.32% |
| K$_2$O | 3.69% |
| Moisture | 5.05% |
| pH | 5.05 |

This example illustrates that the same nitrogen characteristics, agglomeration and expansion of material was obtained as in Example 1 at a lower U-F ratio (2.00/1.0) and at a lower nitrogen analysis content.

EXAMPLE 3

This example illustrates the preparation of a fertilizer composition from a coffee ground carrier from which the natural oils had not been removed. The composition was prepared by the process of Example 1, using a U-F ratio of 2.36/1.0, from the following ingredients:

| Ingredient | Gms |
|---|---|
| Urea | 613.88 |
| U-F Concentrate | 237.76 |
| Water | 76.74 |
| Potassium Chloride | 163.65 |
| Monoammonium Phosphate | 176.46 |
| Coffee Grounds | 868.08 |
| Sulfuric Acid (24.2%) | 56.30 |

Final analysis of the fertilizer product was as follows:

| | |
|---|---|
| Total Nitrogen | 15.23% |
| CWIN | 34.47% |
| HWIN | 16.74% |
| Moisture | 4.26% |

These results indicate a much lower absorptive capacity was obtained with coffee grounds retaining their natural oil content, resulting in a lower nitrogen analysis of the final product.

EXAMPLE 4

The coffee grounds used in this example were grounds as they would be obtained from a percolator coffee pot. They were granular in form as opposed to the flake-like form of coffee grounds from the freeze-dried process. The U-F ratio was 2.36/1.0. The ingredients used in the preparation of this example by the process of Example 1 were as follows:

| Ingredients | Gms |
|---|---|
| Urea | 132.60 |
| U-F Concentrate | 51.35 |
| Water | 15.58 |
| Potassium Chloride | 28.28 |
| Monoammonium Phosphate | 30.50 |
| Coffee Grounds | 150.00 |
| Sulfuric Acid (24.2%) | 12.17 |

The final analysis of the fertilizer product was as follows:

| | |
|---|---|
| Total Nitrogen | 16.95% |
| CWIN | 29.44% |
| HWIN | 12.74% |
| Moisture | 1.41% |

Since these grounds were already granular in form, the granulation and expansion effect of the grounds was not obtained as it was in Examples 1-3. The absorptive capacity of these pot grounds was accordingly much lower than those of examples 1 and 2 and approximately the same as that of example 3 in which the natural oils were not removed. Repetition of this example with removal of the natural oils resulted in no increase in the absorptive capacity. The final analysis was essentially the same as that in which the natural oils were not removed. The particle size of this formulation from pot grounds was too large for use with a conventional drop spreader.

EXAMPLE 5

A continuous run of the process of the invention was made in a pilot plant facility. A 25-3-3, N-P-K, fertilizer product at a urea-formaldehyde mole ratio of 2.36 was prepared using the following flow rates:

| | |
|---|---|
| Urea | 6.00 lb/min |
| U-F Concentrate | 2.32 lb/min |
| Water | 0.96 lb/min |
| Potassium Chloride | 0.67 lb/min |
| Monoammonium Phosphate | 0.72 lb/min |
| Coffee Grounds | 3.88 lb/min |

The urea, U-F concentrate, and water were metered into a steam jacketed, agitated kettle for a retention time of about 40 minutes at these flow rates. The temperature of the kettle was maintained at 71° C. and the pH controlled at 8.3 with NaOH solution. This kettle overflowed into a second kettle of the same type and size which was controlled at 65° C. and a pH of 7.5 to insure complete urea dissolution.

The KCl, monoammonium phosphate and coffee were metered onto a collecting conveyor which discharged into a paddle mixer. The methylol-urea solution from the second kettle was pumped to this same mixer and sprayed onto the mixing solids about ⅓ of the distance from the solids feed end of the mixer (⅔ of the way from the discharge end of the mixer). Sulfuric acid at a 20% concentration was sprayed at 98 ml/min onto the methylol-urea solution/solids mixture about ½ way down the mixer to initiate the condensation reaction. The discharge from mixer was at a pH of about 5.3. This system allows one mixer to preblend the solids and provide for liquids addition and mixing. The discharge from the mixer was now a damp granular product. This product was conveyed to a belt dryer operating at 143° C. and with a heating retention time of about 17 minutes. A cooling zone was also utilized. The dryer discharge was run through a standard screening-milling loop sizing the product to −8 U.S. mesh. A cage mill and rotating screen were employed. The product had the resulting chemical analysis:

| | |
|---|---|
| Total Nitrogen | 25.2% |
| Available P$_2$O$_5$ | 3.1% |
| Soluble K$_2$O | 3.4% |
| CWIN | 28% |
| HWIN | 12% |
| pH | 5.8 |
| Moisture | 1.8% |

U.S. sieve analyses and bulk densities of the coffee used and of the final product were as follows:

| Coffee Grounds | | Final Product | |
|---|---|---|---|
| Screen Analysis | % | Screen Analysis | % |
| +8 | 0.4 | +8 | 1.7 |
| −8+10 | 0.4 | −8+10 | 14.2 |
| −10+20 | 21.4 | −10+20 | 49.2 |
| −20+40 | 29.0 | −20+40 | 22.3 |
| −40+70 | 23.4 | −40+50 | 6.7 |
| −70+100 | 2.6 | −50+70 | 3.3 |
| −100+200 | 7.9 | −70 | 2.6 |
| −200 | 14.9 | | |
| Total | 100.0 | | 100.0 |
| Bulk Density | 24.5 lb/ft$^3$ | | 29.5 lb/ft$^3$ |

EXAMPLE 6

Two 100 g samples of the 25-3-3 fertilizer of Example 5 were obtained. One of the samples was analyzed for −40 mesh after 5 min. on a rotap, a device for screen analysis. The other 100 g sample was placed with 500 g of steel balls on the 40 mesh screen and also placed on the rotap for 5 minutes. The results are shown below.

| Original | 500 g Steel Balls |
|---|---|
| −40 US sieve    13.0 g | 19.0 g |

Of the original 87 g of +40 mesh only 6 gms or 7% were broken down into fines in this severe test. The example demonstrates the remarkable physical stability of the product.

EXAMPLE 7

A continuous run of the process of the invention was made in a pilot plant facility. A 22-4-4 N-P-K fertilizer product at a urea-formaldehyde mole ratio of 1.6/1.0 was prepared using the following rates:

| | |
|---|---|
| Urea | 4.00 lb/min |
| U-F concentrate | 2.40 lb/min |
| Potassium Chloride | 0.84 lb/min |
| Monoammonium Phosphate | 0.91 lb/min |
| Coffee | 2.99 lb/min |
| Ammonium Sulfate | 3.57 lb/min |

The urea, U-F concentrate and water were metered into a steam jacketed, agitated kettle for a retention time of about 55 minutes at these flow rates. The temperature of the kettle was controlled at about 71° C. and the pH at 7.6 with NaOH solution. A second kettle as in the previous example was not required.

The remainder of this example was identical to Example 5 except that ammonium sulfate was included with the other solids and the mixer discharge pH was about 5.6.

The product had the resulting chemical analysis:

| | |
|---|---|
| Total Nitrogen | 22.8% |
| Available P$_2$O$_5$ | 4.1% |
| Soluble K$_2$O | 4.1% |
| CWIN | 42% |
| HWIN | 30% |
| Moisture | 1.2% |

The granulation or expansion/agglomeration effect with the coffee grounds appears to result from the water portion of the resinous mixture of methylol ureas. The resiliency of the granulation, that is its ability to retain its granular form, is attributed to the presence of the resin in the coffee grounds. These conclusions are based upon a series of test results. When water alone is added to coffee grounds, the expansion/agglomeration effect occurs as with the fertilizer formulation. However, when the coffee grounds plus water are subjected to the same order of drying conditions as the fertilizer formulations, the coffee grounds revert back to their original form. On the other hand, such reversion does not occur with the resin impregnated coffee grounds used in fertilizer preparation. However, when urea is substituted for the urea-formaldehyde resinous product, the granules break down to a powder. Moreover, when liquids other than water are blended with the coffee grounds, the granulation effect is not obtained. These results are shown in the following example.

EXAMPLE 8

A series of solvents were blended with 50 grams of coffee grounds in order to determine the granulating and expanding capabilities of the respective solvents. In the last two samples, urea and then a urea-formaldehyde concentrate, were added to compare the resiliency of the granules after subjecting them to drying conditions. The results are set forth in the following table:

| Sample | Liquid | Quantity GMS | Results |
|---|---|---|---|
| 1 | Water | 59.9 | Agglomeration and expansion of particles noted by increase in volume of grounds. When placed in dryer conditions, volume and physical characteristics reverted to original form. |
| 2 | Methyl Carbitol | 50.0 | No expansion of grounds was evident. |
| 3 | Hexylene Glycol | 50.0 | No expansion of grounds was evident. |
| 4 | Petroleum Distillate | 50.0 | No expansion of grounds was evident |
| 5 | Methanol | 50.0 | Expansion of grounds at about 50% of that obtained with water Reverted to original form with volatilization of methanol. |
| 6 | Water plus Urea (Urea dissolved in water) | 59.9 116.4 | Both granulation and expansion of grounds occured. Expanded particles were very fragile and easily broken down to dust form. |
| 7 | Urea-formaldehyde Concentrate (Partially reacted resin in water solution) | 45.3 | Both granulation and expansion of particles occured with increase in volume of material. Particle was quite stable and retained the granular form under dryer conditions. |

It appears from the above that an expansion and granulation effect is being obtained with coffee grounds and that this effect is obtained and stabilized only by use of water and the urea-formaldehyde reaction product. This effect appears to be unique with the urea-formaldehyde/water system. The granulation effect with coffee grounds was not obtained with any other solution investigated.

While the invention has been illustrated with straight fertilizer composition, it is equally applicable to combination fertilizer products. In the latter case, liquid or solid pesticides would be added to the fertilizer product after processing of the fertilizer product is completed.

We claim:

1. A fertilizer composition comprising free flowing granules, said granules comprising expanded, substantially oil-free coffee grounds as a carrier, said coffee grounds being the residue of coffee beans remaining after extraction of soluble components, said coffee grounds being coated and impregnated with a urea-formaldehyde condensation product, the ratio of urea to formaldehyde in said condensation product ranging from 1 to 3 moles of urea for each mole of formaldehyde, said composition having at least 15% of the total nitrogen in cold water insoluble form.

2. The fertilizer composition of claim 1 in which the coffee grounds contain a maximum of 4% oil.

3. The fertilizer composition of claim 1 in which the granules are coated and impregnated with at least one other fertilizer ingredient in addition to the urea-formaldehyde condensation product.

4. The fertilizer composition of claim 3 in which the other fertilizer ingredient is selected from the group consisting of a phosphorus nutrient, a potassium nutrient, ammonium sulfate and ferrous sulfate.

5. The fertilizer composition of claim 1 in which the coffee grounds are from 10 to 50% by weight of the total weight of the composition.

6. The fertilizer composition of claim 1 having a total nitrogen content by weight of from 15 to 35%.

7. The fertilizer composition of claim 1 having at least 25% of the total nitrogen in cold water insoluble form.

8. A process for preparing a fertilizer composition comprising
producing an aqueous solution of methylol urea by reacting urea and formaldehyde in an alkaline solution in which the ratio of urea to formaldehyde ranges from 1 to 3 moles of urea for each mole of formaldehyde,
contacting substantially oil-free coffee grounds with said aqueous solution of methylol urea to expand said coffee grounds and to coat and impregnate the expanded coffee grounds with said methylol urea, said coffee grounds being the residue of coffee beans remaining after extraction of soluble components, and
acidifying said methylol urea while coated and impregnated on said coffee grounds to form by condensation therefrom a urea-formaldehyde condensation product, whereby a free-flowing granular fertilizer composition is produced having at least 15% of the total nitrogen in cold water insoluble form.

9. The process of claim 8 in which the aqueous solution of methylol urea is produced from an alkaline solution having a pH of from 7 to 9.5.

10. The process of claim 8 in which the aqueous solution of methylol urea also contains free urea.

11. The process of claim 8 in which said methylol urea is condensed to a urea-formaldehyde condensation product by acidifying to a pH of from 4.5 to 6.5.

12. The process of claim 8 in which said coffee grounds are contacted with said aqueous solution by spraying said solution onto said coffee grounds.

13. The process of claim 8 in which said expanded coffee grounds, coated and impregnated with the urea-formaldehyde condensation product, is heated after acidification to complete condensation and reduce the moisture content.

14. The process of claim 8 in which the coffee grounds are mixed with a nutrient source in addition to the urea-formaldehyde condensation product prior to contact with the aqueous solution of methylol urea, said additional nutrient source being selected from the group consisting of a phosphorus nutrient, a potassium nutrient, ammonium sulfate and ferrous sulfate.

* * * * *